US012773619B2

(12) United States Patent
Anthony et al.

(10) Patent No.: US 12,773,619 B2
(45) Date of Patent: Oct. 27, 2026

(54) SYSTEMS AND METHODS FOR PROVIDING A USER INTERFACE

(71) Applicant: Sony Interactive Entertainment Inc., Tokyo (JP)

(72) Inventors: Mark Anthony, London (GB); Jun Yen Leung, London (GB); Paul Terence Mulligan, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 138 days.

(21) Appl. No.: 18/650,458

(22) Filed: Apr. 30, 2024

(65) Prior Publication Data

US 2024/0374994 A1 Nov. 14, 2024

(30) Foreign Application Priority Data

May 12, 2023 (GB) ..................................... 2307066

(51) Int. Cl.
*A63F 13/24* (2014.01)
*A63F 13/28* (2014.01)
*A63F 13/5375* (2014.01)
*A63F 13/48* (2014.01)

(52) U.S. Cl.
CPC .............. *A63F 13/28* (2014.09); *A63F 13/24* (2014.09); *A63F 13/5375* (2014.09); *A63F 13/48* (2014.09)

(58) Field of Classification Search
CPC .......... A63F 13/24; A63F 13/26; A63F 13/28; A63F 13/48; A63F 13/92; A63F 13/537; A63F 13/5375
See application file for complete search history.

(56) References Cited

U.S. PATENT DOCUMENTS

| | | | |
|---|---|---|---|
| 8,628,423 B2 | 1/2014 | Chung et al. | |
| 8,663,013 B2 | 3/2014 | Egozy et al. | |
| 9,019,203 B2 | 4/2015 | Asuke et al. | |
| 9,155,960 B2 | 10/2015 | Argiro | |
| 9,597,600 B2 * | 3/2017 | Chung | .................... A63F 13/61 |
| 10,220,314 B2 | 3/2019 | Ikeda et al. | |
| 10,315,108 B2 | 6/2019 | Perry | |
| 10,384,122 B2 | 8/2019 | Matsukawa | |
| 10,398,968 B2 | 9/2019 | Zeng | |

(Continued)

FOREIGN PATENT DOCUMENTS

| | | | |
|---|---|---|---|
| CN | 114917576 A | 8/2022 | |
| EP | 2778855 A2 * | 9/2014 | ........... G06F 3/0412 |

(Continued)

OTHER PUBLICATIONS

Extended European Search Report for corresponding EP Application No. 24171825.3, 8 pages, dated Sep. 25, 2024.

(Continued)

*Primary Examiner* — Steven J Hylinski
(74) *Attorney, Agent, or Firm* — Fish & Richardson P.C.

(57) ABSTRACT

A method for providing a user interface on a controller having a plurality of input elements. The method includes the step of loading game data to initiate interactive gameplay; and sending control signals to the controller based on the interactive gameplay to provide a lighting effect on a light emitting element associated with one of the plurality of input elements, wherein the lighting effect corresponds to the associated input element.

20 Claims, 9 Drawing Sheets

(56) References Cited

U.S. PATENT DOCUMENTS

| | | | | |
|---|---|---|---|---|
| 10,799,791 | B2 | 10/2020 | Matsukawa | |
| 11,179,645 | B2 | 11/2021 | Soute et al. | |
| 11,224,809 | B2 | 1/2022 | Takahashi | |
| 12,023,593 | B2 * | 7/2024 | de la Cruz | A63F 13/67 |
| 2004/0063502 | A1 | 4/2004 | Hussaini | |
| 2005/0246638 | A1 * | 11/2005 | Whitten | A63F 13/10 715/708 |
| 2006/0154725 | A1 * | 7/2006 | Glaser | A63F 13/24 463/37 |
| 2009/0094535 | A1 * | 4/2009 | Bromenshenkel | A63F 13/67 715/757 |
| 2009/0280909 | A1 * | 11/2009 | McEniry | A63F 13/30 463/42 |
| 2010/0045660 | A1 * | 2/2010 | Dettinger | G06Q 90/00 345/419 |
| 2010/0082516 | A1 * | 4/2010 | Basu | G06Q 30/02 706/46 |
| 2011/0021271 | A1 | 1/2011 | Ikeda et al. | |
| 2011/0059793 | A1 | 3/2011 | Kondo et al. | |
| 2011/0086686 | A1 | 4/2011 | Avent et al. | |
| 2012/0021840 | A1 * | 1/2012 | Johnson | A63F 13/60 463/43 |
| 2012/0258800 | A1 | 10/2012 | Mikhailov | |
| 2013/0021234 | A1 | 1/2013 | Umminger et al. | |
| 2013/0116022 | A1 * | 5/2013 | Davison | A63F 13/355 463/9 |
| 2013/0316779 | A1 * | 11/2013 | Vogel | G06Q 10/06375 463/16 |
| 2014/0315642 | A1 | 10/2014 | Grant et al. | |
| 2017/0144074 | A1 * | 5/2017 | Brunstetter | A63F 13/95 |
| 2019/0022520 | A1 | 1/2019 | Leeming et al. | |
| 2019/0358545 | A1 * | 11/2019 | Aghdaie | A63F 13/67 |
| 2020/0038765 | A1 | 2/2020 | Soute et al. | |
| 2021/0113922 | A1 | 4/2021 | Summa | |
| 2021/0339132 | A1 | 11/2021 | Shakespeare | |
| 2021/0402292 | A1 * | 12/2021 | Chow | G02B 27/017 |
| 2022/0395752 | A1 * | 12/2022 | Kennett | G06V 20/41 |
| 2023/0148072 | A1 | 5/2023 | Samperi | |
| 2023/0191245 | A1 | 6/2023 | Teng | |
| 2024/0058700 | A1 * | 2/2024 | Juenger | A63F 13/323 |

FOREIGN PATENT DOCUMENTS

| | | | |
|---|---|---|---|
| EP | 3755444 | A4 | 11/2021 |
| EP | 4171769 | A1 | 5/2023 |
| EP | 4282501 | A1 | 11/2023 |
| GB | 2634023 | A | 4/2025 |
| NL | 2017609 | B1 | 4/2018 |
| WO | 0067864 | A1 | 11/2000 |
| WO | WO 2018070869 | A1 | 4/2018 |
| WO | WO 2019164805 | A1 | 8/2019 |
| WO | WO 2021262375 | A1 | 12/2021 |

OTHER PUBLICATIONS

Combined Search and Examination for corresponding GB Application No. 2307066.7, 8 pages, dated Feb. 27, 2024.

* cited by examiner

SYSTEMS AND METHODS FOR PROVIDING A USER INTERFACE

BACKGROUND OF THE INVENTION

Field of the Invention

The present invention relates to systems and methods for providing a user interface on a game controller.

DESCRIPTION OF THE PRIOR ART

The user interface (UI) for playing a video game typically consists of various on-screen elements and controls that allow the player to interact with the game environment and control the game character. The specific UI elements and controls can vary depending on the type of games and platforms.

One common example of controls is a game controller that has a variety of input means such as buttons, joysticks and touchscreens that enable the user to manipulate the game character such as performing an action, and interact with the game elements in the game world. Game controllers may take various forms, for example, a console controller with directional pads, functional buttons, and joysticks. Other examples includes specialized controllers designed for a specific type of game, such as racing or flight simulators, and motion sensing controllers for detecting the player's body movement.

Feedback to the players is usually provided through a display device showing the game characters and game environment. Other on-screen UI elements are also used to provide important game information to the player, such as a heads-up display (HUD) which is a graphical overlay of the game player's view of the game environment displaying information such as health status, weapon status, score, and countdown timer. Known game controllers also include some type of feedback mechanism, such as vibration or force feedback, which provides tactile sensations that help to enhance the player's immersion in the game. Nevertheless, the conventional arrangements tend to suffer from one or more of a multiplicity of drawbacks:

Firstly, the conventional game controller feedback mechanism cannot provide information specifically for the operation of input devices on the game controller. Although such information may be provided on the game screen shown on the display device, the game screen usually contains overwhelming amount of information and it may be difficult for the player to locate such information.

Secondly, the conventional game controller feedback mechanism also cannot feedback information specifically for a game element related to the input devices on the game controller, such as a button or a joystick, so as to allow effective operation and control of the game controller.

The present invention seeks to mitigate or alleviate some or all of the above-mentioned problems.

SUMMARY OF THE INVENTION

Various aspects and features of the present invention are defined in the appended claims and within the text of the accompanying description.

In a first aspect, a method for providing a user interface on a controller having a plurality of input devices is provided.

In another aspect, a controller for interfacing with a game apparatus is provided.

In a further aspect, an information processing apparatus for providing a user interface on a controller having a plurality of input devices is provided.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A video game system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Embodiments of the present description are applicable to a video game system involving a video game console, a development kit for such a system, or a video game system using dedicated hardware or a computer and suitable controllers. In the present application terms such as 'user' and 'player', 'dialogue' and 'narrative' may be used interchangeably except where indicated otherwise.

Figure 1:
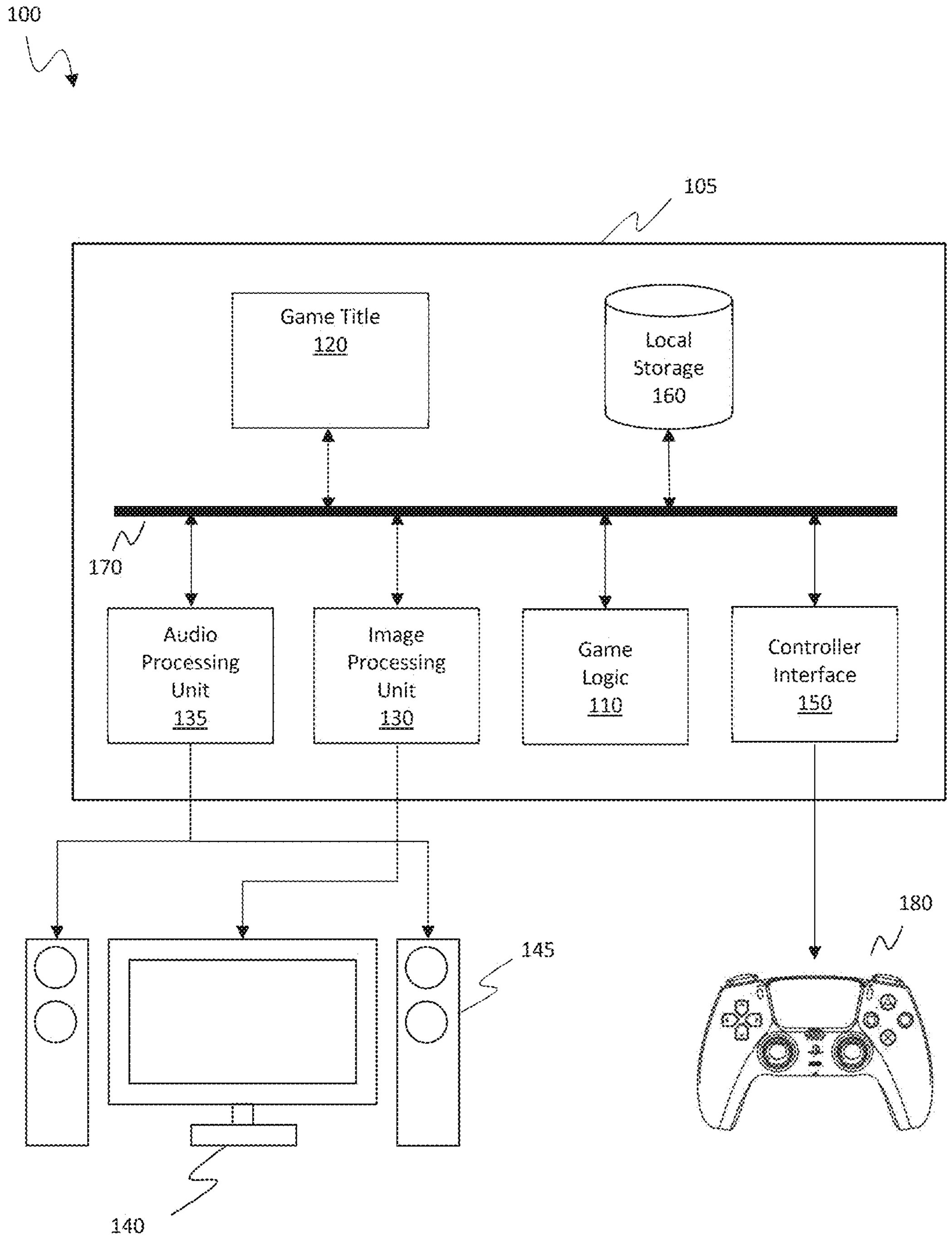
FIG. 1 is a schematic diagram of a video game system in accordance with embodiments of the present application.

For the purposes of explanation and referring now to the drawings, wherein like reference numerals designate identical or corresponding parts throughout the several views, FIG. 1 illustrates a schematic diagram of a video game system 100 in accordance with embodiments of the present application. The video game system 100 may comprise a game console 105, a display device 140, a speaker system 145, and a game controller 180. In some cases such as for example portable game consoles, the display device 140, speaker system 145 and game controller 180 may be integral to the video game system 100.

According to embodiments of the present application, the video game system 100 provides a user interface on a game controller 180 which allows the user to receive information from the game controller regarding a specific input device on the game controller. In this case, the game console 105, such as a PlayStation®, accesses the game title database 120 and loads game data to initiate interactive gameplay. According to embodiments of the present application, the game controller 180 contains multiple input devices such as buttons and joysticks. In the case of buttons, the game controller 180 may further contain multiple light emitting elements, such as light emitting diodes, that are associated with the respective buttons. In the case of joysticks, multiple light emitting elements, such as light emitting diodes, may be arranged on the game controller 180 to associate with different movement directions of the respective joysticks. The light emitting elements may produce different lighting effects based on different colours, brightness and patterns, in order to represent different game information corresponding to the associated input devices on the game controller 180. Although FIG. 1 shows only a gamepad as the game controller, it is envisaged that embodiments of the present application are applicable to other types of game controllers such as steering wheels, paddles, flight sticks, light guns, keyboards and mouses.

Referring to the video game system 100 in FIG. 1, the game console 105 comprises a game logic 110, a game title database 120, an image processing unit 130, an audio processing unit 135, a game controller interface 150, and a local storage 160. The components of the game console 105 are connected via a bus 170.

The game logic 110 executes game code loaded from the game content storage 124 of the game title database 120, in order to generate the game environment which interacts with the player character. The game logic 110 may also load user save data and user settings stored in local storage 160. The user may control the player character by operating the game controller 180, and the game logic 110 processes the input signals received from the game controller via the game controller interface 150.

The image processing unit 130 renders 2D or 3D computer graphics for the game environment and game feedbacks generated by the game logic 110. The image processing unit 130 then generates video signals for the game graphics, such as the game environment based on the player's perspective, and transmits the video signals to the display device 140.

Additionally, the audio processing unit 135 retrieves sound files and music files from the game title database 120 corresponding to the game environment and feedbacks generated by the game logic 110, then decompresses and decodes the files into audio signals for playback at the speaker system 145 to produce background music, character speech, audio tracks, sound effects of the game environment and the like.

Further, the controller interface 150 generates haptic feedback effects such as vibration on the game controllers 180 based on the game environment and game feedbacks generated by the game logic 110.

According to embodiments of the present application, the controller interface 150 also generates lighting feedback effects on the game controller 180 to provide game information such as directional indication to the user. The lighting feedback is generated by displaying lighting patterns on the light emitting elements associated with the respective input devices of the game controller 180. As such, the user can receive information that corresponding to the input devices of the game controller 180 in a way that feels more natural and intuitive. Accordingly, a more engaging and immersive gaming experience can be provided.

Further details of the video game console 105 will be described with reference to FIG. 2.

Figure 2:
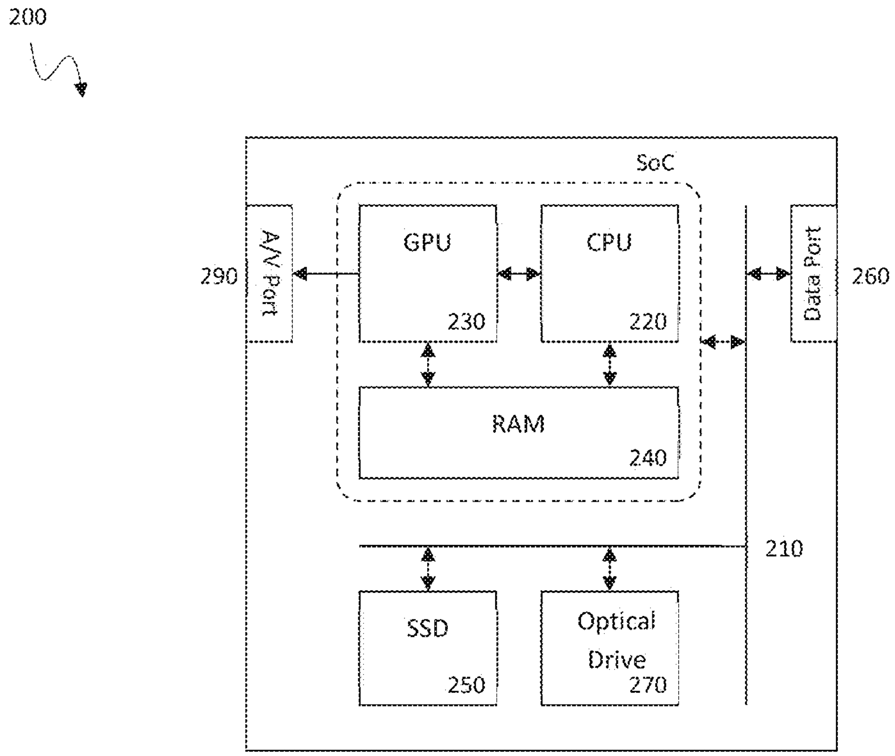
FIG. 2 is a schematic diagram of an entertainment device in accordance with embodiments of the present application.

FIG. 2 illustrates a schematic diagram of an entertainment device in accordance with embodiments of the present application. The entertainment device comprises a central processor 220. This may be a single or multi core processor, for example comprising eight cores as in the PlayStation 5® ('PS5'). The entertainment device also comprises a graphical processing unit or GPU 230. The GPU can be physically separate to the CPU, or integrated with the CPU as a system on a chip (SoC) as in the PS5.

The entertainment device also comprises RAM 240, and may either have separate RAM for each of the CPU and GPU, or shared RAM as in the PS5. The or each RAM can be physically separate, or integrated as part of an SoC as in the PS5. Further storage is provided by a disk 250, either as an external or internal hard drive, or as an external solid state drive, or an internal solid state drive as in the PS5.

The entertainment device may transmit or receive data via one or more data ports 260, such as a USB port, Ethernet® port, WiFi® port, Bluetooth® port or similar, as appropriate. It may also optionally receive data via an optical drive 270.

Interaction with the system is typically provided using one or more handheld controllers 280, such as the DualSense® controller in the case of the PS5.

Audio/visual outputs from the entertainment device are typically provided through one or more A/V ports 290, or through one or more of the wired or wireless data ports 260.

Where components are not integrated, they may be connected as appropriate either by a dedicated data link or via a bus 210.

Such an entertainment device may be used as a game console 105 in a video game system 100 to generate signals for the game controller 180 based on the interactive gameplay to provide a lighting effect that corresponds to the associated input devices on the game controller 180. It will be appreciated that this is a non-limiting example and that as noted previously herein other examples of a game console may include a phone or smart television.

Figure 3:
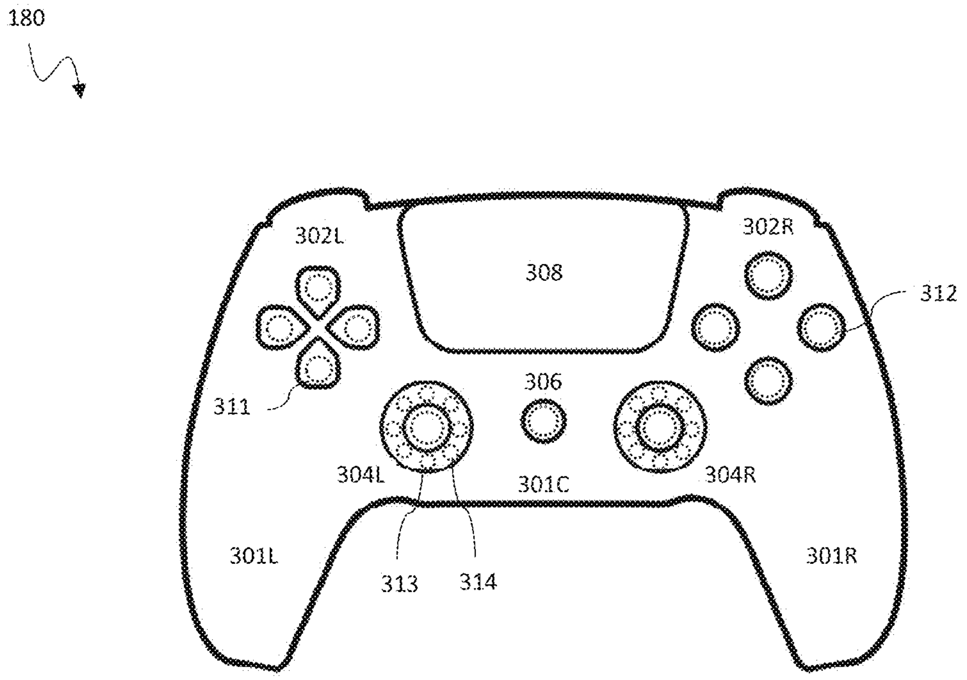
FIG. 3 is a controller for interfacing with the entertainment device in FIG. 2 in accordance with embodiments of the present application.

FIG. 3 illustrates a controller for interfacing with the game console 105 in accordance with embodiments of the present application. Such a controller typically has two handle sections 301L, 301R and a central body 301C. Various controls or input devices are distributed over the controller, typically in local groups. Examples include a left button group 302L, which may comprise directional controls and/or one or more shoulder buttons, and similarly right button group 302R, which comprise function controls and/or one or more shoulder buttons. The controller also includes left and/or right joysticks 304L, 304R, which may optionally also be operable as buttons by pressing down on them.

The controller (typically in the central portion of the device) may also comprise one or more system buttons 306, which typically cause interaction with an operating system of the entertainment device rather than with a game or other application currently running on it; such buttons may summon a system menu, or allow for recording or sharing of displayed content. Furthermore, the controller may comprise one or more other elements such as a touchpad 308, a light for optical tracking (not shown), a screen (not shown), haptic feedback elements (not shown), and the like.

The controller may also comprise light emitting elements 311-314, each associated with one of the controls on the controller 180. The light emitting elements 311-314 may be light emitting diodes embedded in the controls. In the case of button control, the light emitting elements 311, 312 may be placed under the respective buttons that are transparent or partially transparent. In the case of joystick control, the light emitting elements 313, 314 may be arranged around the joystick corresponding to different movement directions of the respective joysticks, and placed under the controller housing that is transparent or partially transparent. The light emitting elements 311-314 may produce different lighting effects based on different colours, brightness and patterns, in order to represent different game information corresponding to the associated controls on the controller.

Figure 4:
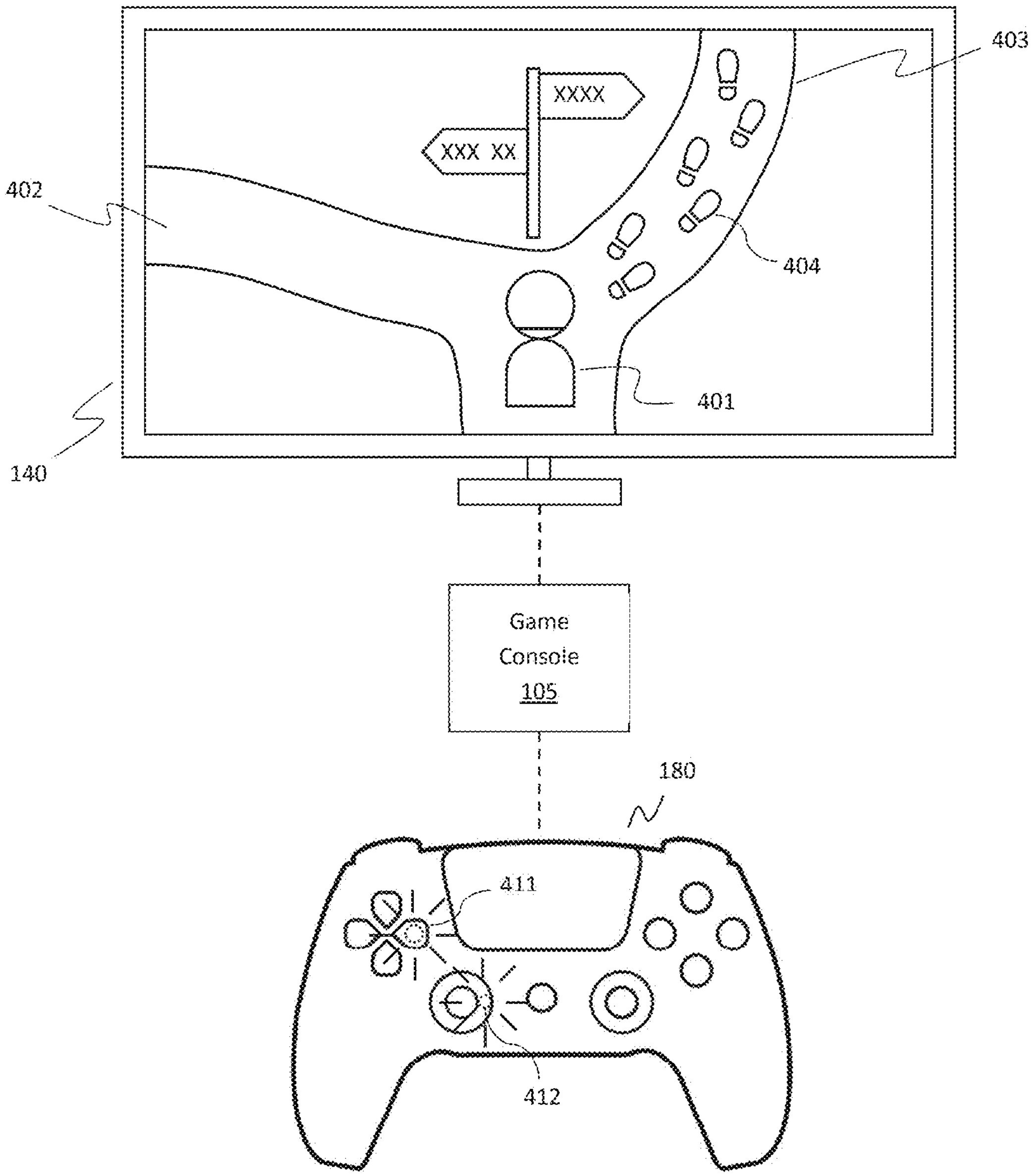
FIG. 4 is an example scenario of providing a user interface on a controller in accordance with embodiments of the present application.

FIG. 4 illustrates an example scenario of providing a user interface on a controller in accordance with embodiments of the present application. The example scenario describes the display device 140 showing a video game environment generated by the game console 105, in which a player character 401 in an adventure game is working on a quest and comes to a road junction. The player then needs to decide between a path 402 on the left and a path 403 on the right. The game environment shown on the display device 140 may provide guidance on the direction to the location of the quest in the form of footprints 404. In the meantime, the game console 105 generates a visual feedback on the game controller 180 by lighting up the light emitting element 411 associated with the directional button corresponding to the guiding direction. Optionally or additionally, the directional indication is provided by one of the light emitting elements around with the associated joystick, in such a way that the light emitting element 412 corresponding the guiding direction is turned on. As such, the user can receive directional indication coming directly from a corresponding input device of the game controller 180 in a way that feels more natural and intuitive. Accordingly, a more engaging and immersive gaming experience can be provided.

Optionally or additionally, the lighting effect produced by the light emitting elements may be lighting up, blinking, or glowing. In one example, the lighting effect may be based on a status of the game character corresponding to an input, such as a weapon button. The weapon button may flash in red colour when the weapon is out of ammunition. Optionally or additionally, the colour of the lighting effect may be based on the colours in the part of the game environment within view of the in-game virtual camera, such as the colour of the sky in the game world, thereby adding user immersion and realism to the game.

Optionally or additionally, the lighting effect of the light emitting element associated with an input devices for providing directional indication is based on the distance between the game character and a target object in the game environment. For example, the brightness and/or colour of the light emitting elements associated with a directional button or a direction of a directional stick corresponding to the guiding direction may be based on the distance of a quest location from the game character.

Optionally or additionally, the lighting effect based on the directional indications is produced on the light emitting elements 411, 412 only if an operation following the directional indication is not performed by the user within a predetermined length of time, such as 3 seconds, after the information of the directional indication has been displayed on the display device 140. As such, unnecessary distraction caused by the lighting effect can be avoided.

Figure 5:
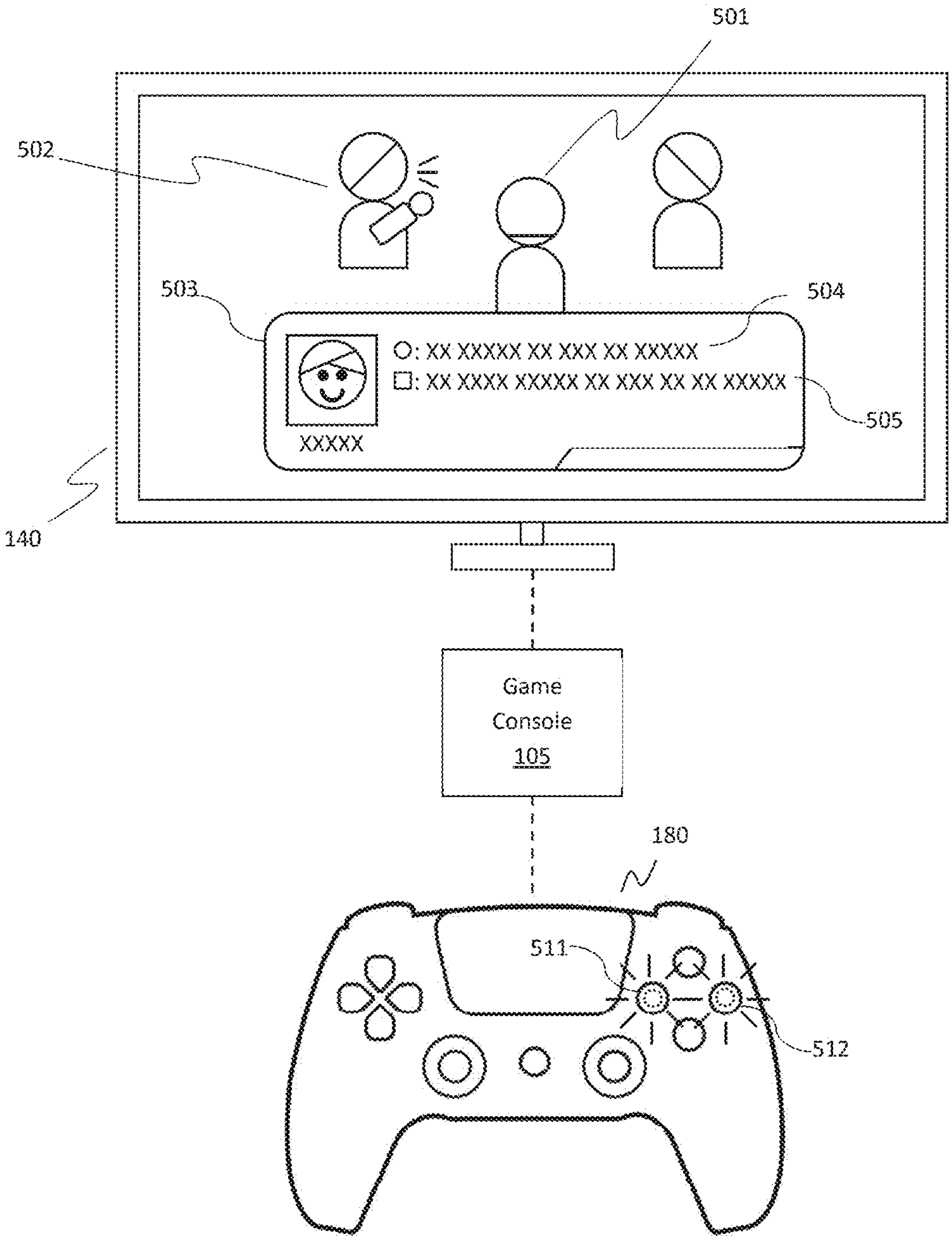
FIG. 5 is another example scenario of providing a user interface on a controller in accordance with embodiments of the present application.

FIG. 5 illustrates another example scenario of providing a user interface on a controller in accordance with embodiments of the present application. The example scenario describes the display device 140 showing a video game environment generated by the game console 105, in which the player character 501 encounters certain game events, such as engaging with a non-playable character (NPC), interacting with a game item, or change of character status, and causes the display of a narrative or enters a conversation with a non-playable character 502. The game console 105 generates a graphical a user interface containing a dialogue window 503. The dialogue window 503 displays the dialogue text and provide two choices of response 504, 505 for the player to react to the non-playable character 502. The player is required to perform a predetermined operation on the game controller 180, that is, selecting between the choices of response 504, 505 by pressing the corresponding buttons 511, 512 on the controller 180.

In the meantime, the game console 105 generates a visual feedback on the game controller 180 by lighting up the light emitting elements associated with the functional buttons 511, 512, that correspond the choices of response 504, 505. As such, the user can receive hints of performing an operation coming directly from a corresponding input device of the game controller 180 in a way that feels more natural and intuitive. Accordingly, a more engaging and immersive gaming experience can be provided.

Optionally or additionally, the lighting effect produced by the light emitting elements may be lighting up, blinking, or glowing. The colour of the lighting effect may be based on the colours in the part of the game environment within view of the in-game virtual camera, such as the colour of the room where the game characters conduct the conversation, thereby adding user immersion and realism to the game.

Optionally or additionally, the lighting effect based on a predetermined operation required to be performed is produced on the light emitting elements associated with the functional buttons 511, 512, only if the predetermined operation is not performed by the user within a predetermined length of time, such as 3 seconds, after the information of the predetermined operation has been displayed on the display device 140, for example, the dialogue window 503. As such, unnecessary distraction caused by the lighting effect can be avoided.

Figure 6:
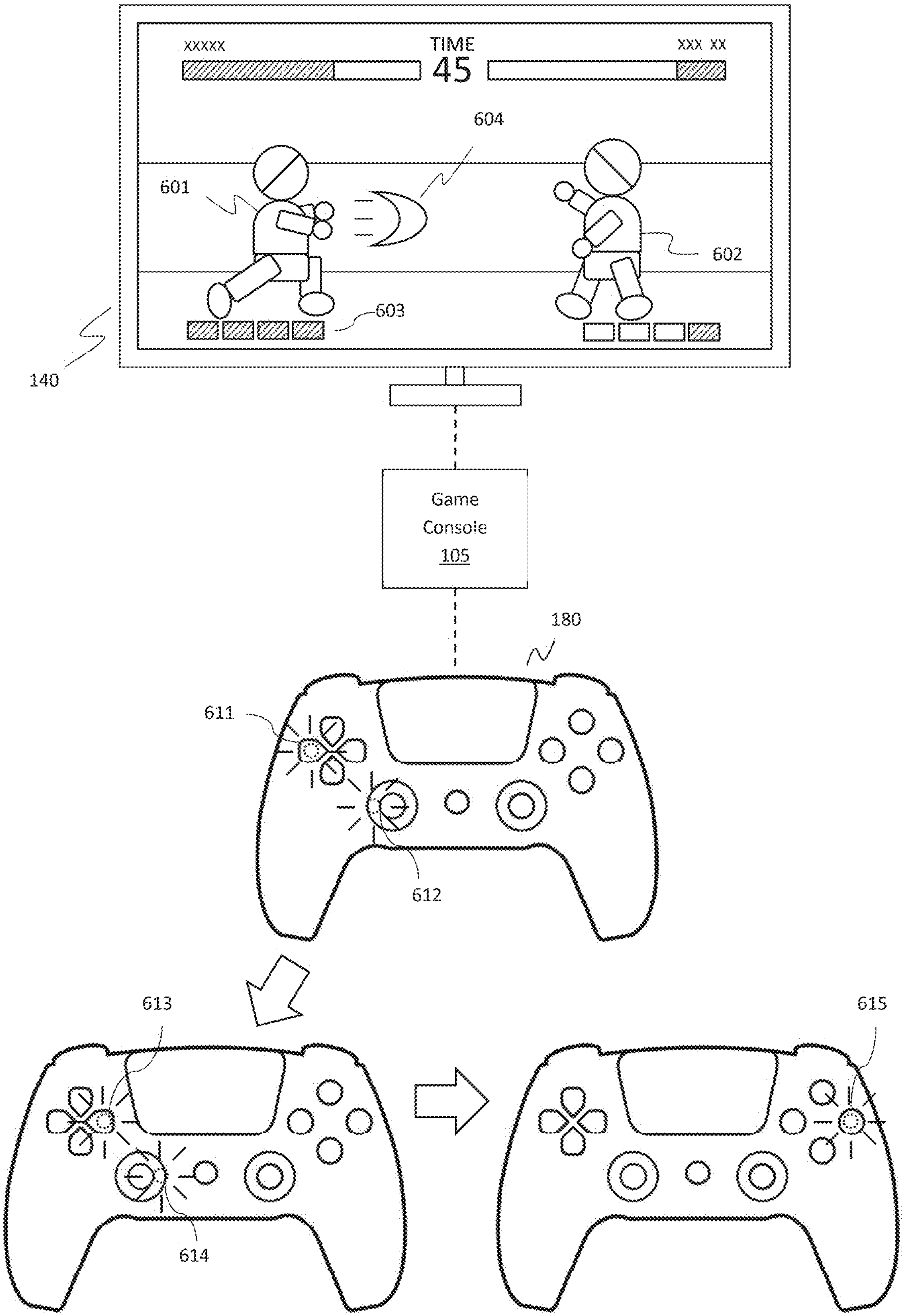
FIG. 6 is a further example scenario of providing a user interface on a controller in accordance with embodiments of the present application.

FIG. 6 illustrates a further example scenario of providing a user interface on a controller in accordance with embodiments of the present application. The example scenario describes the display device 140 showing a video game environment generated by the game console 105, in which a player character 601 is combating in a one-on-one match against an opponent 602. After the energy bar 603 is charged up, the player character 601 is able to perform a "super move" which results in a much stronger attack 604 with special effect. The super move is triggered by a predetermined sequence of button presses, for example, in the order of "left" button, "right" button, and "O" button.

In the meantime, the game console 105 generates a visual feedback on the game controller 180 by lighting up the light emitting elements 611, 613, 615 associated with the buttons for performing the super move, to indicate that the energy bar is fully charged and the super move is ready to perform. Additionally, the sequence of button presses required to perform the super move can be demonstrated to the player by blinking the light emitting elements 611, 613, 615 in sequential order. Optionally or additionally, if the predetermined sequence of operations involves movements of a joystick, the light effect demonstration is provided by one or more of the light emitting elements around the associated joystick, in such a way that the light emitting elements 612, 614 corresponding to the movement directions are turned on in the order of the predetermined sequence. As such, the user can see a demonstration of the predetermined operation directly from the corresponding input devices of the game controller 180 in a way that feels more natural and intuitive. Accordingly, a more engaging and immersive gaming experience can be provided.

Optionally, in addition to showing, reminding, or training the user to become proficient with the input sequence per se, the lighting may alternatively or in addition be used to indicate the timing of an input sequence where this is relevant. Further optionally, the lighting may be used to indicate a period in which to use the associated input device, so that the user must follow the within a sequence of lights to correctly input the sequence on the controller.

Optionally or additionally, an input device of the game controller is an analogue input device, such as a directional stick, a steering wheel or an analogue button, the lighting effect of the light emitting element associated with the analogue input devices is based on a degree of movement applied or needed to be applied to the analogue input devices. For example, if an input device is a directional stick such as an analogue joystick or a flight stick having multiple movement directions, the game controller may have multiple light emitting elements, each associated with a different movement directions of the directional stick. The brightness and/or colour of the light emitting elements around the directional stick may also be based on a degree of movement applied to the directional stick in the associated movement direction. In another example, if an input device is a steering wheel, the game controller may have multiple light emitting elements, each associated with a different rotation directions of the steering wheel. The brightness and/or colour of the light emitting elements on the steering wheel may also be based on a degree of movement applied to the steering wheel in the associated rotation direction. In a further example, if an input device is an analogue button or a pedal, the game controller may have a light emitting element associated with the analogue button or the pedal. The brightness and/or colour of the light emitting elements associated with the analogue button or the pedal may also be based on a degree of push movement applied to the analogue button or the pedal.

Optionally or additionally, the lighting effect for demonstrating the predetermined operation is produced on the light emitting elements 611-615 only if the predetermined operation is not performed by the user within a predetermined length of time, such as 3 seconds, after the relevant information has been displayed on the display device 140, for example, the fully charged energy bar 603. As such, unnecessary distraction caused by the lighting effect can be avoided.

Optionally or additionally, the lighting effect produced by the light emitting elements may be lighting up, blinking, or glowing. In one example, the lighting effect may be based on a status of the game character corresponding to an input device, such as a weapon button. In the event the weapon becomes out of ammunition, the weapon button may flash in red colour to alert the player. In another example, a button may be associated with an ultimate skill of the game character. The light emitting element associated with the ultimate skill button may display blue colour when the ultimate skill is on cool down, and flash in green colour when the ultimate skill is ready.

Optionally or additionally, the colour of the lighting effect may be based on the colours in the part of the game environment within view of the in-game virtual camera, such as the theme colour of the fighting arena in the game world, thereby adding user immersion and realism to the game.

Optionally or additionally, the lighting effect produced by a light emitting element may be a visual feedback in response to an operation performed on the associated input device of the game controller. For example, the embedded LED of a push button will light up when the push button is pressed.

Figure 7:
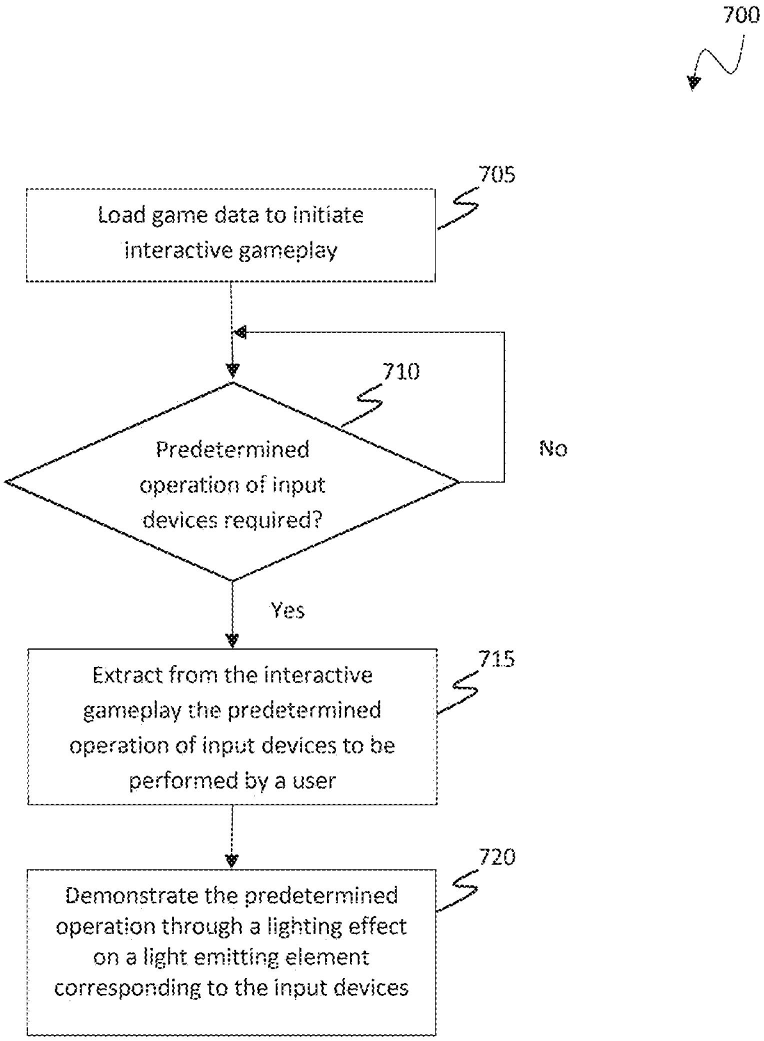
FIG. 7 is a flow diagram of a method of providing a user interface on a controller for demonstrating a predetermined operation of input devices on the controller in accordance with embodiments of the present application.

FIG. 7 shows a flow diagram describing a computerized process 700 of providing a user interface on a controller for demonstrating a predetermined operation of input devices on the controller in accordance with embodiments of the present application. Process 700 may begin at step 705, where the player turns on the game console 105 and load game data to initiate an interactive gameplay.

The process then moves to step 710 where the game console waits until a predetermined operation of input devices on the game controller 180 is required by the interactive gameplay. The process then proceeds to step 715 where the game console 105 extracts from the interactive gameplay the predetermined operation of input devices required to be performed by a user.

At step 720, the game console 105 sends control signals to the game controller 180 so as to demonstrate the predetermined operation through a lighting effect on a light emitting element corresponding to the input devices. Optionally or additionally, the game console 105 sends control signals to the game controller 180 to produce the lighting effect based on the part of game environment at a predetermined delay, such as 3 seconds, after the information of the part of game environment is displayed on the display device 140. As such, unnecessary distraction caused by the lighting effect due to rapid changes of the game environment can be avoided.

Figure 8:
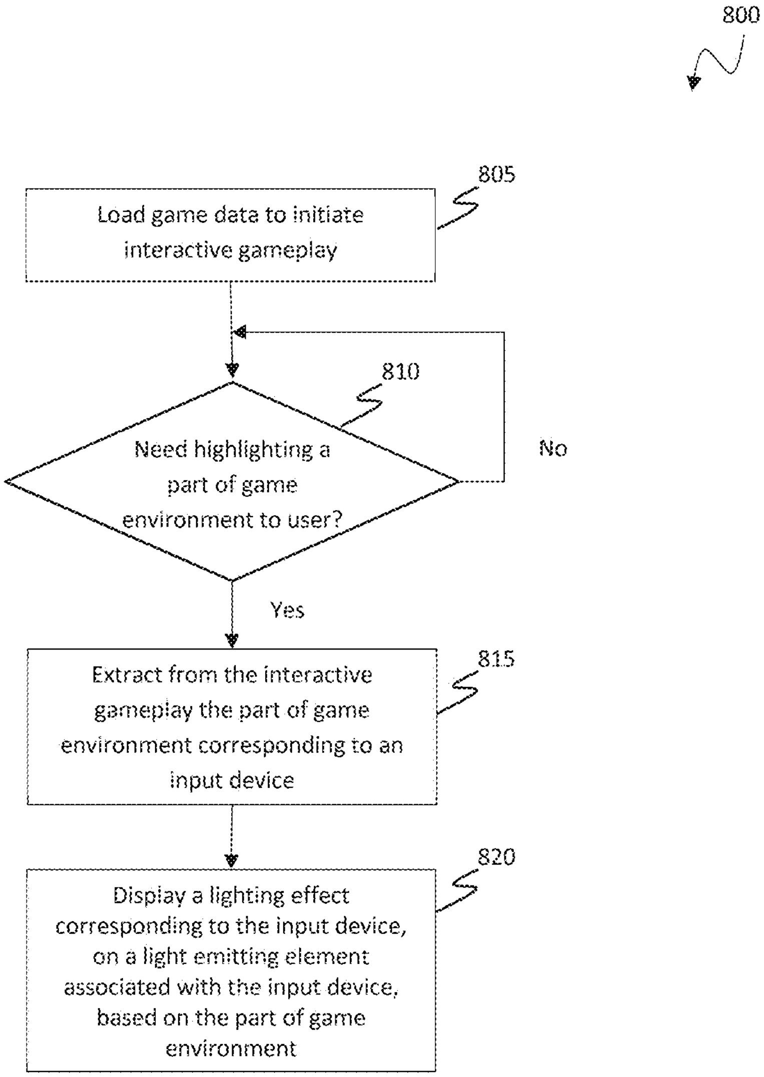
FIG. 8 is a flow diagram of a method of providing a user interface on a controller for highlighting a part of game environment in accordance with embodiments of the present application.

FIG. 8 shows a flow diagram describing a computerized process 800 of providing a user interface on a controller for highlighting a part of game environment in accordance with embodiments of the present application. Process 800 may begin at step 805, where the player turns on the game console 105 and load game data to initiate an interactive gameplay.

The process then moves to step 810 where the game console waits until highlighting a part of game environment (or game state) to the player is required by the interactive gameplay. The process then proceeds to step 815 where the game console 105 extracts from the interactive gameplay the part of game environment corresponding to an input device that is required to be highlighted to the user.

At step 820, the game console 105 sends control signals to the game controller 180 so as to display a lighting effect corresponding to the input device, on a light emitting element associated with the input device, based on the part of game environment extracted from the interactive gameplay.

Figure 9:
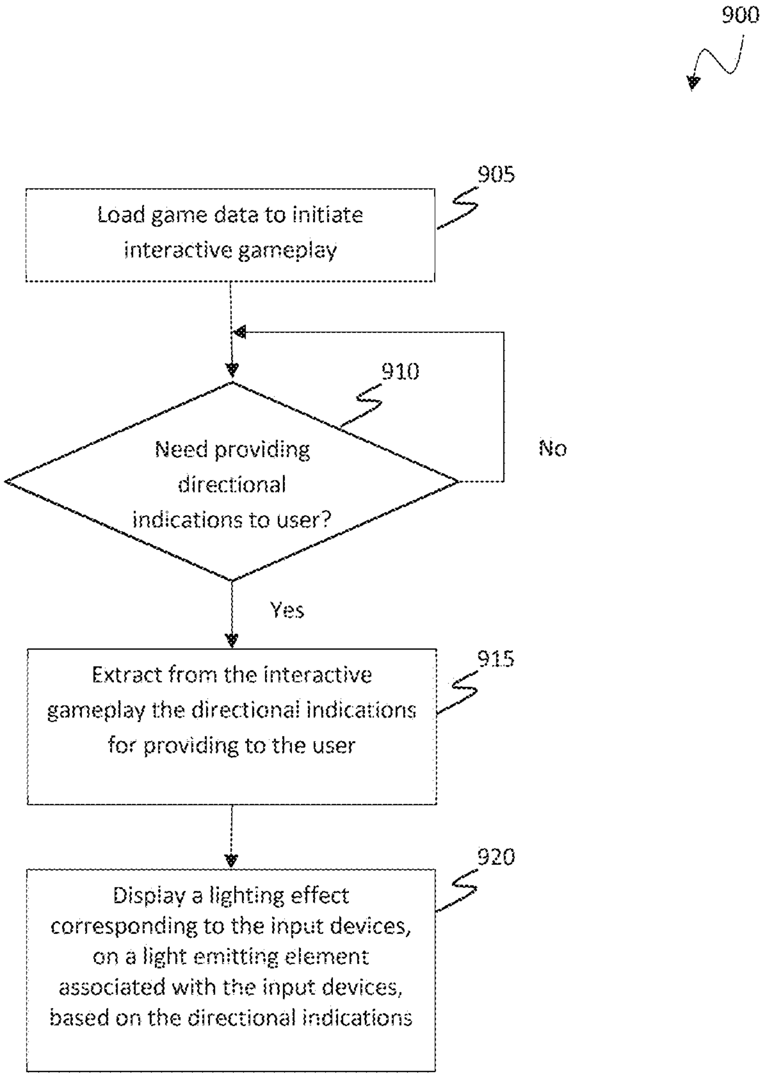
FIG. 9 is a flow diagram of a method of providing a user interface on a controller for providing directional indications in accordance with embodiments of the present application.

FIG. 9 shows a flow diagram describing a computerized process 900 of providing a user interface on a controller for providing directional indications in accordance with embodiments of the present application. Process 900 may begin at step 905, where the player turns on the game console 105 and load game data to initiate an interactive gameplay.

The process then moves to step 910 where the game console waits until providing directional indications to the player is required by the interactive gameplay. The process then proceeds to step 915 where the game console 105 extracts from the interactive gameplay the directional indications that is required to be provided to a user.

At step 920, the game console 105 sends control signals to the game controller 180 so as to provide the directional indications through a lighting effect on a light emitting element corresponding to the input devices. Optionally or additionally, the game console 105 sends control signals to the game controller 180 to produce the lighting effect for directional indications only if an operation following the directional indication is not performed by the user within a predetermined length of time, such as 3 seconds, after the information of the directional indication has been displayed on the display device 140. As such, unnecessary distraction caused by the lighting effect can be avoided.

Examples of the directional indications that may reflect the game environment or game state include indicating available directions (e.g. exits), indicating a direction relevant to a quest or other in-game goal (thus providing path guidance potentially without the need for such a path to be visible on-screen, which can break immersion or occlude other important elements of the environment), and indicating other player or non-player characters, which may for example be outside the in-game field of view. Where the lighting effect can be differentiated by colour, brightness or pattern, prioritisation or categorisation of the indicated game environment or state elements can also be provided, for example using green lights for allies and red lights for enemies, or indicating all exits with static lights but one relevant to a quest with a pulsing light.

Variations in the systems, methods and techniques herein may also be contemplated.

For example, rather than turning on the light emitting elements, various lighting effect can be produced by the light emitting elements, such as a dynamic display pattern by blinking, flashing or glowing a single light emitting element, or a group of related light emitting elements, or even generating a dynamic running pattern by sequentially turning on the relevant light emitting elements. Further visual effect can be provided by changing the colour of the light emitting elements, and a combination of colour change and dynamic display pattern.

While the analogue movement of an input device, such as a steering wheel, may be represented by a lighting effect including multiple levels of brightness of an associated light emitting element, an array of light emitting elements may also be used to reflect the degree of movement of the input device. For example, the number of light emitting elements in the array being switched on is determined by the degree of rotation of the steering wheel.

It is relatively common for users to change the user settings and customize the mapping of various input devices of the controller to game functions. For example, a player may prefer to use the left button group 302L to control the movement directions of the game character, whereas another player may prefer to use the right button group 302R for the same functions. In such case, the lighting effects produced by a light emitting element are therefore associated with the function performed by the button instead of a physical position of the button.

Different users may have different preferences of the lighting effects displayed on the game controller. Hence optionally, the light effects produced by a light emitting element may be customized by the user by changing the user settings stored in local storage 160. For example, the user may assign a specific colour or dynamic display pattern in response to an operation of an associated input device, a change of game element in the game environment, a change of player character status, or the like.

It will be appreciated that the above methods may be carried out on conventional hardware suitably adapted as applicable by software instruction (e.g. game console 105) or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in a summary embodiment of the present description, an information processing apparatus comprises the following.

Firstly, a game execution module (e.g.: game logic 110) is configured (for example by suitable software instruction) to load game data to initiate interactive gameplay, as described elsewhere herein.

Secondly, an interface module (e.g.: game controller interface 150) is configured (for example by suitable software instruction) to send control signals to a controller based on the interactive gameplay to provide a lighting effect on a light emitting element associated with one of a plurality of input devices on the controller, as described elsewhere herein. In particular, the lighting effect corresponds to the associated input device.

It will be apparent to a person skilled in the art that variations in the above system corresponding to the various embodiments of the method as described and claimed herein are considered within the scope of the present invention, including but not limited to that:

In an instance of the summary embodiment, the light emitting element is embedded in the associated input device, as described elsewhere herein;

In an instance of the summary embodiment, the plurality of input devices comprises an digital input device, and the lighting effect of the light emitting element associated with the digital input device is based on the state of the digital input device, as described elsewhere herein;

In an instance of the summary embodiment, the digital input device is a push button, as described elsewhere herein;

In an instance of the summary embodiment, the plurality of input devices comprises an analogue input device, and the lighting effect of the light emitting element associated with the analogue input device is based on a degree of movement of the analogue input device, as described elsewhere herein;

In an instance of the summary embodiment, the analogue input device is a directional stick having a plurality of movement directions, and the controller further comprising a plurality of light emitting elements, each associated with the plurality of movement directions of the directional stick, as described elsewhere herein;

In an instance of the summary embodiment, the lighting effect of the light emitting element is based on a degree of movement in the associated movement direction of the directional stick, as described elsewhere herein;

In an instance of the summary embodiment, the analogue input device is a rotational wheel, and further comprising a plurality of light emitting elements, each associated with one of the rotational directions of the rotational wheel, as described elsewhere herein;

In an instance of the summary embodiment, the lighting effect of the light emitting element is based on a degree of rotation in the associated rotational direction of the rotational wheel, as described elsewhere herein;

In an instance of the summary embodiment, the method comprises extracting from the interactive gameplay a predetermined operation of at least one of the plurality of the input devices to be performed by a user, and demonstrating the predetermined operation through a lighting effect on a light emitting element corresponding to the input device, as described elsewhere herein;

In an instance of the summary embodiment, the predetermined operation of at least one of the plurality of the input devices comprises simultaneous operations or a sequence of operations, as described elsewhere herein;

In an instance of the summary embodiment, the method comprises displaying information of the predetermined operation on a display device, wherein the predetermined operation is demonstrated through the lighting effect on the light emitting element corresponding to the input device at a predetermined delay after the information of the predetermined operation is displayed on the display device, as described elsewhere herein;

In an instance of the summary embodiment, the method comprises extracting from the interactive gameplay a part of game environment corresponding to at least one of the input devices, displaying a lighting effect corresponding to the input device, on a light emitting element associated with the input device, based on the part of game environment, as described elsewhere herein;

In an instance of the summary embodiment, the method comprises displaying information of the part of game environment on a display device, wherein the lighting effect based on the part of game environment is displayed on the light emitting element at a predetermined delay after the information of the part of game environment is displayed on the display device, as described elsewhere herein;

In an instance of the summary embodiment, the method comprises extracting from the interactive gameplay a plurality of directional indications provided to a user, displaying a lighting effect corresponding to the input device, on a light emitting element associated with the input device, based on the plurality of directional indications, as described elsewhere herein; and In an instance of the summary embodiment, the method comprises displaying information of the directional indications on a display device, wherein the lighting effect based on the directional indications is displayed on the light emitting element at a predetermined delay after the information of the directional indications is displayed on the display device, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Consistory Set of Clauses

1. A method for providing a user interface on a controller having a plurality of input devices, comprising the step of: loading game data to initiate interactive gameplay; and sending control signals to the controller based on the interactive gameplay to provide a lighting effect on a light emitting element associated with one of the plurality of input devices, wherein the lighting effect corresponds to the associated input device.
2. The method for providing a user interface on a controller according to claim 1, wherein the light emitting element is embedded in the associated input device.
3. The method for providing a user interface on a controller according to clause 1, wherein said plurality of input devices comprises a digital input device; and the lighting effect of the light emitting element associated with the digital input device is based on the state of the digital input device.
4. The method for providing a user interface on a controller according to clause 3, wherein said digital input device is a push button.
5. The method for providing a user interface on a controller according to clause 1, wherein said plurality of input devices comprises an analogue input device, and the lighting effect of the light emitting element associated with the analogue input device is based on a degree of movement of the analogue input device.
6. The method for providing a user interface on a controller according to clause 5, wherein said analogue input device is a directional stick having a plurality of movement directions, and the controller further comprising a plurality of light emitting elements, each associated with the plurality of movement directions of the directional stick.
7. The method for providing a user interface on a controller according to clause 6, wherein the lighting effect of the light emitting element is based on a degree of movement in the associated movement direction of the directional stick.
8. The method for providing a user interface on a controller according to clause 1, wherein said analogue input device is a rotational wheel; and further comprising a plurality of light emitting elements, each associated with one of the rotational directions of the rotational wheel.
9. The method for providing a user interface on a controller according to clause 8, wherein the lighting effect of the light emitting element is based on a degree of rotation in the associated rotational direction of the rotational wheel.
10. The method for providing a user interface on a controller according to clause 1, further comprising the step of: extracting from the interactive gameplay a predetermined operation of at least one of the plurality of the input devices to be performed by a user; and demonstrating the predetermined operation through a lighting effect on a light emitting element corresponding to the input device.
11. The method for providing a user interface on a controller according to clause 10, wherein the predetermined operation of at least one of the plurality of the input devices comprises simultaneous operations or a sequence of operations.

12. The method for providing a user interface on a controller according to clause 10, further comprising the step of displaying information of the predetermined operation on a display device, wherein the predetermined operation is demonstrated through the lighting effect on the light emitting element corresponding to the input device only if the predetermined operation is not performed by the user within a predetermined length of time after the information has been displayed on the display device.

13. The method for providing a user interface on a controller according to clause 1, further comprising the step of: extracting from the interactive gameplay a part of a game environment corresponding to at least one of the input devices; and displaying a lighting effect corresponding to the input device, on a light emitting element associated with the input device, based on the part of game environment.

14. The method for providing a user interface on a controller according to clause 13, further comprising the step of displaying information of the part of game environment on a display device, wherein the lighting effect based on the part of game environment is displayed on the light emitting element at a predetermined delay after the information of the part of game environment is displayed on the display device.

15. The method for providing a user interface on a controller according to clause 1, further comprising the step of: extracting from the interactive gameplay a plurality of directional indications provided to a user; and displaying a lighting effect corresponding to the input device, on a light emitting element associated with the input device, based on the plurality of directional indications.

16. The method for providing a user interface on a controller according to clause 13, further comprising the step of displaying information of the directional indications on a display device, wherein the lighting effect based on the directional indications is displayed on the light emitting element corresponding to the input device only if an operation following the directional indication is not performed by the user within a predetermined length of time after the information has been displayed on the display device. at a predetermined delay after the information of the directional indications is displayed on the display device.

17. A computer program comprising computer executable instructions adapted to cause a computer system to perform the method of any one of the preceding clauses.

18. A controller for interfacing with a game apparatus, comprising: a plurality of input devices; a plurality of light emitting elements, each associated with one of the plurality of input devices, wherein the light emitting elements provide a lighting effect corresponding to the associated input device.

19. The controller for interfacing with a game apparatus according to clause 18, wherein the light emitting element is embedded in the associated input device.

20. The controller for interfacing with a game apparatus according to clause 18, wherein said plurality of input devices comprises an digital input device; and the lighting effect of the light emitting element associated with the digital input device is based on the state of the digital input device.

21. The controller for interfacing with a game apparatus according to clause 18, wherein said digital input device is a push button.

22. The controller for interfacing with a game apparatus according to clause 18, wherein said plurality of input devices comprises an analogue input device, and the lighting effect of the light emitting element associated with the analogue input device is based on a degree of movement of the analogue input device.

23. The controller for interfacing with a game apparatus according to clause 22, wherein said analogue input device is a directional stick having a plurality of movement directions, and the controller further comprising a plurality of light emitting elements, each associated with the plurality of movement directions of the directional stick.

24. The controller for interfacing with a game apparatus according to clause 23, wherein the lighting effect of the light emitting element is based on a degree of movement in the associated movement direction of the directional stick.

25. The controller for interfacing with a game apparatus according to clause 18, wherein said analogue input device is a rotational wheel; and further comprising a plurality of light emitting elements, each associated with one of the rotational directions of the rotational wheel.

26. The controller for interfacing with a game apparatus according to clause 25, wherein the lighting effect of the light emitting element is based on a degree of rotation in the associated rotational direction of the rotational wheel.

27. The controller for interfacing with a game apparatus according to clause 18, wherein the lighting effect demonstrates an operation of at least one of the plurality of the input devices.

28. The controller for interfacing with a game apparatus according to clause 27, wherein the operation of at least one of the plurality of the input devices comprise simultaneous operations or a sequence of operations.

29. The controller for interfacing with a game apparatus according to clause 18, wherein the lighting effect of the light emitting element is based on the colours in the part of game environment.

30. The controller for interfacing with a game apparatus according to clause 18, wherein the lighting effect of the light emitting element is based on directional indications provided to the user.

31. An information processing apparatus for providing a user interface on a controller having a plurality of input devices, comprising: means for loading game data to initiate interactive gameplay; and means for sending control signals to the controller based on the interactive gameplay to provide a lighting effect on a light emitting element associated with one of the plurality of input devices, wherein the lighting effect corresponds to the associated input device.

32. The information processing apparatus for providing a user interface on a controller according to clause 31, further comprising: means for extracting from the interactive gameplay a predetermined operation of at least one of the plurality of the input devices to be performed by a user; and means for sending control signals to the controller to demonstrate the predetermined operation through a lighting effect on a light emitting element corresponding to the input device.

33. The information processing apparatus for providing a user interface on a controller according to clause 32, further comprising: means for sending control signals to the controller to display information of the predetermined operation on a display device, wherein the predetermined operation is demonstrated through the lighting effect on the light emitting element corresponding to the input device at a predetermined delay after the information of the predetermined operation is displayed on the display device.

34. The information processing apparatus for providing a user interface on a controller according to clause 31, further comprising: means for extracting from the interactive gameplay a part of game environment corresponding to at least one of the input devices; and means for sending control signals to the controller to display a lighting effect corresponding to the input devices, on a light emitting element associated with the input device, based on the part of game environment.

35. The information processing apparatus for providing a user interface on a controller according to clause 34, further comprising: means for sending control signals to the controller to display information of the part of game environment on a display device, wherein the lighting effect based on the part of game environment is displayed on the light emitting element at a predetermined delay after the information of the part of game environment is displayed on the display device.

36. The information processing apparatus for providing a user interface on a controller according to clause 31, further comprising: means for extracting from the interactive gameplay a plurality of directional indications provided to a user; and means for sending control signals to the controller to display a lighting effect corresponding to the input device, on a light emitting element associated with the input device, based on the plurality of directional indications.

The invention claimed is:

1. A method for providing a user interface on a controller having a plurality of input devices, the method comprising:

loading game data to initiate interactive gameplay;

extracting, from the interactive gameplay, a predetermined operation of at least one of the plurality of input devices to be performed by a user, wherein the plurality of input devices comprises an analog input device;

sending control signals to the controller based on the predetermined operation to provide a lighting effect on a light emitting element associated with one of the plurality of input devices, wherein the lighting effect demonstrates the predetermined operation; and demonstrating the predetermined operation through the lighting effect on the light emitting element corresponding to the analog input device, and wherein the lighting effect of the light emitting element associated with the analog input device is based on one or both of (i) a direction and (ii) a distance, between a game character controlled by the user and a target object in an environment of the interactive gameplay.

2. The method for providing a user interface on a controller according to claim 1, wherein the light emitting element is embedded in the in the one of the plurality of input devices.

3. The method for providing a user interface on a controller according to claim 1, wherein:

the plurality of input devices comprises a digital input device, and the lighting effect of the light emitting element associated with the digital input device is based on a state of the digital input device.

4. The method for providing a user interface on a controller according to claim 3, wherein said digital input device is a push button.

5. The method for providing a user interface on a controller according to claim 1, wherein said plurality of input devices comprises an analog input device, and the lighting effect of the light emitting element associated with the analog input device is based on a degree of movement of the analog input device.

6. The method for providing a user interface on a controller according to claim 1, wherein the analog input device is a directional stick having a plurality of movement directions, and the controller further comprising a plurality of light emitting elements, each associated with the plurality of movement directions of the directional stick.

7. The method for providing a user interface on a controller according to claim 6, wherein the lighting effect of the light emitting element is based on a degree of movement in an associated movement direction from the plurality of movement directions for the directional stick.

8. The method for providing a user interface on a controller according to claim 1, wherein said analog input device is a rotational wheel; and further comprising a plurality of light emitting elements, each associated with one of a plurality of rotational directions of the rotational wheel, and wherein the lighting effect of the light emitting element is based on a degree of rotation in an associated rotational direction from the plurality of rotational directions for the rotational wheel.

9. The method for providing a user interface on a controller according to claim 1, wherein the predetermined operation of at least one of the plurality of input devices comprises simultaneous operations or a sequence of operations.

10. The method for providing a user interface on a controller according to claim 1, further comprising:

displaying information of the predetermined operation on a display device, wherein the predetermined operation is demonstrated through the lighting effect on the light emitting element corresponding to the analog input device, and the lighting effect is displayed in response to an absence of the predetermined operation is net-performed by the user within a predetermined length of time.

11. The method for providing a user interface on a controller according to claim 1, further comprising:

extracting from the interactive gameplay a part of a game environment corresponding to at least one input device of the plurality of input devices; and displaying a lighting effect corresponding to the at least one input device, on a light emitting element associated with the at least one input device, based on the part of the game environment.

12. The method for providing a user interface on a controller according to claim 11, further comprising:

displaying information of the part of the game environment on a display device, wherein the lighting effect based on the part of the game environment is displayed on the light emitting element at a predetermined delay after information of the part of the game environment is displayed on the display device.

13. The method for providing a user interface on a controller according to claim 1, further comprising:

extracting, from the interactive gameplay, a plurality of directional indications provided to the user; and displaying a lighting effect corresponding to the input device of the plurality of input devices, on a light emitting element associated with the input device, based on the plurality of directional indications, wherein the lighting effect is based on a directional indication from the plurality of directional indications, wherein the directional indication is displayed on the light emitting element corresponding to the input device, and wherein the lighting effect is displayed in response to an absence of an operation being performed by the user following the directional indication within a predetermined length of time.

14. The method for providing a user interface on a controller according to claim 1, wherein the predetermined operation is a predetermined sequence of operations of at least two of the plurality of input devices, and wherein demonstrating the predetermined operation comprises demonstrating the predetermined sequence of operations through a sequential lighting effect on a plurality of light emitting elements corresponding to the at least two of the plurality of input devices by turning on the plurality of light emitting elements in an order of the predetermined sequence of operations.

15. The method for providing a user interface on a controller according to claim 1, wherein the lighting effect of the light emitting element associated with the analog input device is based on both the direction and the distance between the game character controlled by the user and the target object in the environment of the interactive gameplay.

16. A non-transitory computer-readable storage medium storing a computer program comprising computer executable instructions adapted to cause a computer system to perform a method for providing a user interface on a controller having a plurality of input devices, the method comprising:

loading game data to initiate interactive gameplay;

extracting, from the interactive gameplay, a predetermined operation of at least one of the plurality of input devices to be performed by a user, wherein the plurality of input devices comprises an analog input device;

sending control signals to the controller based on the predetermined operation to provide a lighting effect on a light emitting element associated with one of the plurality of input devices, wherein the lighting effect demonstrates the predetermined operation; and demonstrating the predetermined operation through the lighting effect on the light emitting element corresponding to the analog input device, and wherein the lighting effect of the light emitting element associated with the analog input device is based on one or both of (i) a direction and (ii) a distance, between a game character controlled by the user and a target object in an environment of the interactive gameplay.

17. A controller for interfacing with a game apparatus, comprising:

a plurality of input devices comprising an analog input device; and a plurality of light emitting elements, each associated with one of the plurality of input devices, wherein the light emitting elements provide a lighting effect corresponding to the associated one of the plurality of input devices, wherein the lighting effect demonstrates a predetermined operation of at least one of the plurality of input devices to be performed by a user, and wherein the lighting effect of a light emitting element of the plurality of light emitting elements associated with the analog input device is based on one or both of (i) a direction and (ii) a distance, between a game character controlled by the user and a target object in an environment of interactive gameplay initiated from game data.

18. An information processing apparatus for providing a user interface on a controller having a plurality of input devices, comprising:

means for loading game data to initiate interactive gameplay;

means for extracting, from the interactive gameplay, a predetermined operation of at least one of the plurality of input devices to be performed by a user, wherein the plurality of input devices comprises an analog input device;

means for sending control signals to the controller based on the predetermined operation to provide a lighting effect on a light emitting element associated with one of the plurality of input devices, wherein the lighting effect demonstrates the predetermined operation; and means for sending control signals to the controller to demonstrate the predetermined operation through the lighting effect on the light emitting element corresponding to the analog input device, and wherein the lighting effect of the light emitting element associated with the analog input device is based on one or both of (i) a direction and (ii) a distance, between a game character controlled by the user and a target object in an environment of the interactive gameplay.

19. The information processing apparatus for providing a user interface on a controller according to claim 18, further comprising:

means for extracting from the interactive gameplay a predetermined operation of at least one of the plurality of the input devices to be performed by a user; and means for sending control signals to the controller to demonstrate the predetermined operation through a lighting effect on a light emitting element corresponding to the input device.

20. The information processing apparatus for providing a user interface on a controller according to claim 18, further comprising:

means for sending control signals to the controller to display information of the predetermined operation on a display device, wherein the predetermined operation is demonstrated through the lighting effect on the light emitting element corresponding to the analog input device at a predetermined delay after the information of the predetermined operation is displayed on the display device.

* * * * *